(12) United States Patent
Melvin et al.

(10) Patent No.: US 8,706,668 B2
(45) Date of Patent: Apr. 22, 2014

(54) FEATURE SET EMBEDDING FOR INCOMPLETE DATA

(75) Inventors: Iain Melvin, Rocky Hill, NJ (US); David Grangier, San Francisco, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 329 days.

(21) Appl. No.: 13/151,480

(22) Filed: Jun. 2, 2011

(65) Prior Publication Data

US 2011/0302118 A1 Dec. 8, 2011

Related U.S. Application Data

(60) Provisional application No. 61/350,584, filed on Jun. 2, 2010.

(51) Int. Cl.
*G06F 17/00* (2006.01)

(52) U.S. Cl.
USPC .......................................................... 706/45

(58) Field of Classification Search
USPC ..................................................... 706/12, 45
See application file for complete search history.

(56) References Cited

U.S. PATENT DOCUMENTS

| | | | | |
|---|---|---|---|---|
| 7,801,748 | B2* | 9/2010 | Bonissone et al. | 705/4 |
| 2001/0028731 | A1* | 10/2001 | Covell et al. | 382/118 |
| 2007/0217676 | A1* | 9/2007 | Grauman et al. | 382/170 |
| 2009/0220429 | A1* | 9/2009 | Johnsen et al. | 424/9.3 |
| 2010/0256977 | A1* | 10/2010 | Yu et al. | 704/240 |

OTHER PUBLICATIONS

Melvin, Iain, et al. "SVM-Fold: a tool for discriminative multi-class protein fold and superfamily recognition." 2007, BMC bioinformatics 8.Suppl 4, pp. 1-15.*
Qiu, Jian, and William Stafford Noble. "Predicting co-complexed protein pairs from heterogeneous data." 2008, PLoS computational biology 4.4, pp. 1-11.*
Xu, Rui, and Donald Wunsch. Survey of clustering algorithms, 2005, Neural Networks, IEEE Transactions on 16.3, pp. 645-678.*
Batista, G., et al. "A Study of K-Nearest Neighbour As an Imputation Method" Hybrid Intelligent Systems (HIS). Dec. 2002. pp. 251-260.
Bhattacharyya, C., et al. "A Second Order Cone Programming Formulation for Classifying Missing Data" Advances in Neural Information Processing Systems (NIPS). Dec. 2004. pp. 153-160.
Chechik, G., et al. "Max-Margin Classification of Data With Absent Features" Journal of Machine Learning Research (JMLR). Jan. 2008. pp. 1-21.

(Continued)

*Primary Examiner* — David Vincent
(74) *Attorney, Agent, or Firm* — Joseph Kolodka (57) ABSTRACT

Methods and systems for classifying incomplete data are disclosed. In accordance with one method, pairs of features and values are generated based upon feature measurements on the incomplete data. In addition, a transformation function is applied on the pairs of features and values to generate a set of vectors by mapping each of the pairs to a corresponding vector in an embedding space. Further, a hardware processor applies a prediction function to the set of vectors to generate at least one confidence assessment for at least one class that indicates whether the incomplete data is of the at least one class. The method further includes outputting the at least one confidence assessment.

19 Claims, 2 Drawing Sheets

(56) References Cited

OTHER PUBLICATIONS

Dekel, O., et al. "Learning to Classify With Missing and Corrupted Features" Proceedings of the 25th International Conference on Machine Learning. Jun. 2008. (8 Pages).

Dick, U., et al. "Learning From Incomplete Data With Infinite Imputations" Proceedings of the 25th International Conference on Machine Learning. Jun. 2008. (8 Pages).

Ghahramani, Z., et al. "Supervised Learning From Incomplete Data Via an EM Approach" Advances in Neural Information Processing Systems (NIPS). 1993. pp. 120-127.

Globerson, A., et al. "Nightmare At Test Time: Robust Learning by Feature Deletion" Proceedings of the 23rd International Conference on Machine Learning. Jun. 2006. pp. 353-360.

Kondor, R., et al. "A Kernel Between Sets of Vectors" Proceedings of the 20th International Conference on Machine Learning. Aug. 2003. (8 Pages).

Liao, X., et al. "Quadratically Gated Mixture of Experts for Incomplete Data Classification" Proceedings of the 24th International Conference on Machine Learning. Jun. 2007. pp. 553-560.

Williams, D., et al. "Incomplete-Data Classification Using Logistic Regression" Proceedings of the 22nd International Conference on Machine Learning. Aug. 2005. pp. 972-979.

\* cited by examiner

FEATURE SET EMBEDDING FOR INCOMPLETE DATA

RELATED APPLICATION INFORMATION

This application claims priority to provisional application Ser. No. 61/350,584 filed on Jun. 2, 2010, incorporated herein by reference.

BACKGROUND

1. Technical Field

The present invention relates to classification of data and, in particular, to classification of incomplete data.

2. Description of the Related Art

A variety of applications employ classification techniques that contend with train and/or test instances that have missing or conflicting features. For example, a spam filter may be trained from data originating from servers storing different features. In addition, a churn predictor may deal with incomplete log features for new customers or a face detector might deal with images for which high resolution cues are corrupted. Further, features analyzed for classification purposes can be missing for a variety of other reasons. For example, applications may suffer from sensor failure or communication errors. Moreover, some features can be "structurally" missing in that the measurements are considered absent because they do not make sense. For example, the application may have log features for new customers. Additionally, applications may rely on different sources for training. Here, each source might not collect the exact same set of features, or might have introduced novel features during the data collection process. Accounting for such missing features is an important aspect of classification techniques and applications that apply them.

SUMMARY

One exemplary embodiment is directed to a method for classifying incomplete data. In accordance with the method, pairs of features and values are generated based upon feature measurements on the incomplete data. In addition, a transformation function is applied on the pairs of features and values to generate a set of vectors by mapping each of the pairs to a corresponding vector in an embedding space. Further, a hardware processor applies a prediction function to the set of vectors to generate at least one confidence assessment for at least one class that indicates whether the incomplete data is of the at least one class. The method further includes outputting the at least one confidence assessment.

Another exemplary embodiment is directed to a system for classifying incomplete data. The system includes a code generator, a transformation module and a prediction module. The code generator is configured to generate pairs of features and values based upon feature measurements on the incomplete data. The transformation module is configured to apply a transformation function on the pairs of features and values to generate a set of vectors by mapping each of the pairs to a corresponding vector in an embedding space for inclusion of the corresponding vector in the set of vectors. In addition, the prediction module is implemented by a hardware processor and is configured to apply a prediction function to the set of vectors to generate a confidence assessment for a class that indicates whether the incomplete data is of the class. The prediction module is further configured to output the confidence assessment.

An alternative exemplary embodiment is directed to a method for training a system to classify incomplete data. The method includes receiving a training data set including a plurality of sets of training feature-value pairs and including a mapping of each of the sets of training feature-value pairs to a corresponding valid class. In addition, layers of the system are modeled as stacked layers. Here, the system includes an embedding transformation layer that is configured to generate a set of vectors by mapping each feature-value pair of at least one of the sets of training feature-value pairs to a corresponding vector in an embedding space. Further, the system includes a prediction transformation layer that is configured to generate, based on the set of vectors, at least one confidence assessment for at least one particular class that indicates whether the incomplete data is of the at least one particular class. The system also includes a probability function layer that assesses a probability that the transformation functions result in a given valid class for a corresponding given training feature-value pair. Moreover, a hardware processor determines parameter sets for each of the layers by iteratively incrementing values of the parameter sets for each of the layers until the probability function layer indicates that the probabilities that the transformation layers result in each of the valid classes for the corresponding sets of feature-value pairs are maximized.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present principles are directed to feature set embedding. In particular, embodiments are directed to learning a classifier from training data which might suffer from missing features. Further, embodiments can also employ the classifier for testing purposes, wherein the classifier can also deal with test data with missing features. Contrary to previous work, the embodiments need not consider instances as vectors from a given feature space. Instead, the embodiments consider instances as a set of (feature, value) pairs and learn to classify the sets directly. For that purpose, the embodiments employ a model that maps each (feature, value) pair onto an embedding space, combine the embedded pairs and apply a linear or non-linear classifier. The embedding space mapping and the classifier can be jointly learned to maximize the conditional probability of the label given to the observed pairs. In contrast to previous work, this set embedding framework naturally handles incomplete data without modeling the missing feature distribution, nor considering an instance-specific decision function. The approaches applied herein can learn to embed set items and to classify sets as a single optimization problem, while prior strategies learn their decision function by considering a fixed mapping from sets into a feature space.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
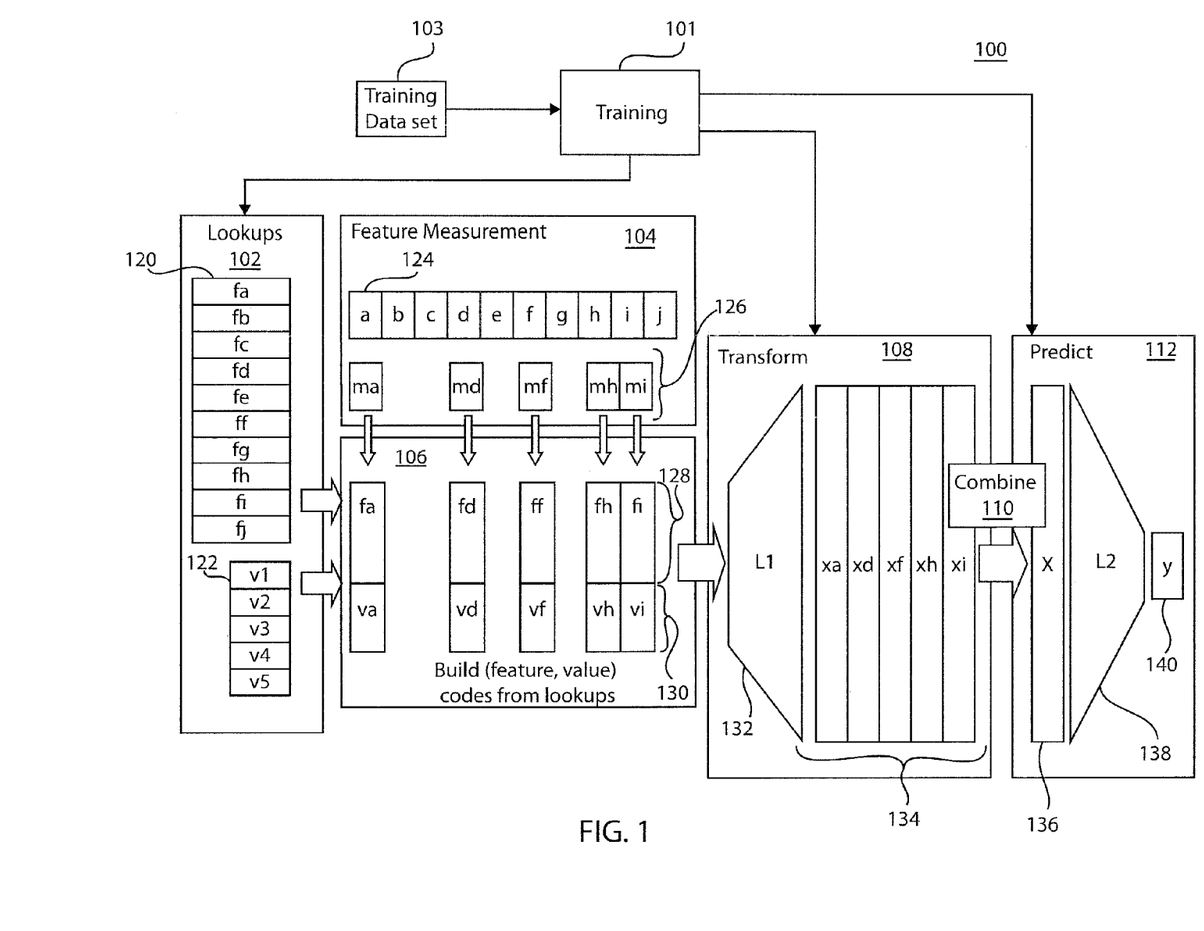
FIG. 1 is high-level block/flow of an embodiment of a system/method for classifying incomplete data.

Referring now to the drawings in which like numerals represent the same or similar elements and initially to FIG. 1, a block/flow diagram of a system/method for classifying data in accordance with an exemplary embodiment 100 is illustrated.

It should be understood that, for expository purposes, it is assumed that the embodiment 100 is applied in a setting in which the missing features are either missing at random, i.e. deletion due to corruption or noise, or structurally missing, i.e. some features do not make sense, as noted above. It should be further understood that the embodiment 100 can be employed in applications that utilize classification techniques that deal with train and/or test instances that have missing features. As noted above, examples include spam filters, churn predictors and face detectors.

Prior to discussing feature embedding and classification in detail, an overview of the system for embodiment 100 is provided. The embodiment 100 can include a training block 101 that can determine a transformation function, a prediction function and a set of "lookup" vectors based on a training data set 103 that the training block 101 can receive.

To classify input data, the embodiment 100 can employ a set of lookup vectors for features 120 and values 122. The lookup vectors are learned representations of features. To illustrate an example of a feature value pair, a handwritten digit classification task is considered. In this case, the features can be from a set of 28×28 pixels, and one feature value pair might be: ('pixel 18', value '0.4') where 0.4 for the value represents a grayscale value for the pixel. As indicated above, the lookup vectors can be learned at block 101 as part of the training of the entire system. For example, the lookup vectors can be learned by utilizing back propagation, as described in more detail herein below.

At block 104, the available input features are measured. For example, a feature measurement module 104 can measure input features 124 to obtain measurements ma, md, . . . mi 126.

At block 106, (feature, value) codes can be built from lookup entries in the lookup block 102. For example, the lookups for the measured features fa, fd, . . . fi 128 are concatenated with the lookups for their values va, vd, . . . vi 130. It should be noted that problem-specific knowledge can be encoded at block 106. Further, block 106 can handle discrete and continuous features in the same model. In addition, block 106 can use 'meta' features, i.e. attributes describing features, and can combine more than one measurement per feature. Moreover, the measurements 126 can include information about feature measurement confidence that can be employed during code building at block 106.

At block 108, the combined (feature, value) lookups 128/130 are passed through a layer 132, which can be a linear layer, resulting in a set of vectors xa, xd, . . . xi 134 in a high dimensional embedding space. In other words, block 108 can implement a transform to higher dimensions. As described in more detail herein below, block 108 can provide capacity control.

At combine block 110, the vectors 134 are combined by means of a linear or non-linear operator into a single vector 'X' 136. In accordance with exemplary aspects, 'mean' or 'max' functions can be used. Thus, block 110 can integrate information provided by each measurement and can convert sets into fixed dimensional vectors. These fixed dimensional vectors can be used by any traditional vector-based machine learning techniques.

At block 112, the vector 'X' 136 is passed through another layer 138, for example, a single linear layer, to produce an output 'y' 140. The output y is a class label that represents a classification of the input features 124. As described further herein below, the relevant parameters of the embedding and classification functions can be learned jointly over the final classification objective.

It should be understood that each of the blocks in the embodiment 100 can be implemented by a hardware processor (not shown) that is configured to retrieve and execute software instructions stored on a storage medium (not shown) to implement the functions of the blocks described herein. Alternatively, each of the blocks can be implemented by an independent, respective hardware processor that employs one or more storage mediums from which it retrieves software instructions for execution to implement the functions of the respective blocks described herein. In addition, various blocks of the embodiment 100 can be implemented as system modules. For example, block 101 can be implemented as a training module, block 104 can be implemented as a feature measurement module, block 106 can be implemented as a code generator, block 108 can be implemented as a transformation module and blocks 110 and 112 can be combined and implemented as a prediction module.

Turning now to more specific aspects of the system/method 100, an example (X,y) is considered, where $X=\{f_i, v_i\}_{i=1}^{|X|}$ is a set of (feature, value) pairs and y is a class label in $Y=\{1, \ldots, k\}$. The set of features is discrete, i.e. $\forall i, f_i \in \{1, \ldots, d\}$, while the feature values are either continuous or discrete, i.e. $\forall i, v_i \in V_{f_i}$ where $V_{f_i} \in \mathbb{R}$ or $V_{f_i}=\{1, \ldots, c_{f_i}\}$. Given a labeled training dataset $D_{train}=\{(X_i, y_i)\}_{i=1}^n$, which can be the training data set 103, the training block 101 can learn a classifier g, which predicts a class from an input set X.

For that purpose, two levels of modeling are combined. At the lower level, (feature, value) pairs are mapped into an embedding space: given an example $X=\{f_i,v_i\}_{i=1}^{|X|}$, a transformation function p predicts an embedding vector $p_i=p(f_i,v_i) \in \mathbb{R}^m$ for each feature value pair $(f_i,v_i)$. For example, the lower level can correspond to the application of feature-value pairs 128/130 to the layer 132 to generate vectors 134. At the upper level, the embedded vectors are combined to make the class prediction: a prediction function h takes the set of embedded vectors $\{p_i\}_{i=1}^{|X|}$ and predicts a vector of confidence values $h(\{p_i\}_{i=1}^{|X|}) \in \mathbb{R}^k$ in which the correct class should be assigned the highest value. For example, the combiner block 110 in the embodiment 100 can combine the set of $\{p_i\}_{i=1}^{|X|}$ vectors 134. Further, the predictor block 112 can apply the function h to the vectors to generate a class y 140. The model composes the two layers, i.e g=h∘p. Intuitively, the first level extracts the information relevant to class prediction provided by each feature, while the second level combines the information over all observed features.

Feature embedding offers great flexibility. The model can accommodate different parameterization depending on the nature of the data, continuous or discrete, and depending on prior knowledge of characteristics shared between groups of features. When the features are discrete, a parameter vector $L_{f,v} \in \mathbb{R}^l$ is associated with each (f,v) and p maps any (f,v) pair as follows, $$p(f,v)=WL_{f,v}$$

where $W \in \mathbb{R}^{m \times l}$ is a parameter matrix. The hyperparameter l controls the capacity of the model: if L is denoted as the matrix concatenating all $L_{f,v}$ vectors, setting l<m means that the matrix WL is at most of rank l. Parameter sharing can also be introduced to indicate that two vectors $L_{f,v}$ and $L_{f,v'}$ originate from the same feature f by posing $$L_{f,v} = \begin{bmatrix} L_f^{(a)} \\ L_{f,v}^{(b)} \end{bmatrix} \text{ where } \begin{cases} L_f^{(a)} \in \mathbb{R}^{l(a)} \\ L_{f,v}^{(b)} \in \mathbb{R}^{l(b)} \\ l(a)+l(b)=l \end{cases}$$

Further, if the feature values share a common physical meaning, for example, gray levels in an image or temperatures measured at different locations, the embodiment 100 can also indicate that two vectors $L_{f,v}$ and $L_{f',v}$ share the same measured value as follows $$L_{f,v} = \begin{bmatrix} L_{f,v}^{(a)} \\ L_v^{(b)} \end{bmatrix}, \text{ where } \begin{cases} L_{f,v}^{(a)} \in \mathbb{R}^{l(a)} \\ L_v^{(b)} \in \mathbb{R}^{l(b)} \\ l(a)+l(b)=l \end{cases}$$

Of course, both sharing strategies can be combined depending on the dataset.

When the feature values are continuous, a similar strategy can be adopted. Here, p can be denoted as follows:

$$p(f,v) = W \begin{bmatrix} L_f^{(a)} \\ vL_f^{(b)} \end{bmatrix}, \text{ where } \begin{cases} L_f^{(a)} \in \mathbb{R}^{l(a)} \\ L_f^{(b)} \in \mathbb{R}^{l(b)} \\ l(a)+l(b)=l \end{cases}$$

where $L_f^{(a)}$ informs about the presence of feature f, while $vL_f^{(b)}$ informs about its value. If the model is thought to not need presence information, $L_f^{(a)}$ can be omitted, i.e. $l^{(a)}=0$.

When the dataset contains a mix of continuous and discrete features, both embedding approaches can be used jointly. For example, if both the discrete approach and the continuous approach are used to embed vectors, the set of vectors describing all observed feature-value pairs that are output by both approaches can be utilized as long as the methods share the same parameter 'm.' Here, the embeddings output using the approaches can be combined by the same h function as a set, regardless of their origin. As such, a mixture of discrete and continuous features that are embedded by different methods can be combined by the same h function. Feature embedding is hence a versatile strategy.

The second level of the architecture, h, considers the set of embedded features and predicts a vector of confidence values. Given an example $X=\{(f_i,v_i)\}_{i=1}^{|X|}$, the function h takes the set $P=\{p(f_i,v_i)\}_{i=1}^{|X|}$ as input and outputs $h(P) \in \mathbb{R}^k$ according to $$h(P)=V\Phi(P)$$

where Φ is a function that takes a set of vectors of $\mathbb{R}^m$ and outputs a single vector of $\mathbb{R}^m$, while V is a k-by-m matrix. This second level is hence related to kernel methods for sets, which first apply a (potentially kernelized) fixed mapping from sets to vectors, before learning a linear classifier in the feature space. In this case, however, Φ is a generalized differentiable function so that h and p can be optimized jointly. In the following, two alternative examples for Φ are considered: a linear function, the mean, and a non-linear function, the component-wise max.

In the linear case, it should be noted that $$h(P) = V \text{ mean}(\{p(f_i,v_i)\}_{i=1}^{|X|})$$
$$= V \text{ mean}(\{WL_{f_i,v_i}\}_{i=1}^{|X|})$$
$$= VW \text{ mean}(\{L_{f_i,v_i}\}_{i=1}^{|X|})$$

by the linearity of the mean. Hence, in this case, the dimension of the embedding space m bounds the rank of the matrix VW. This also means that considering m>k is irrelevant in the linear case. In the specific case where features are continuous and no presence information is provided, i.e. $L_{f,v}=vL_f^{(b)}$, the model is equivalent to a classical linear classifier operating on feature vectors when all features are present, $$g(X)=VW \text{ mean}(\{L_{f_i,v_i}\}_{i=1}^{d})$$

$$= \frac{1}{d}VW \sum_{i=1}^{d} v_i L_{f_i}^{(b)}$$

$$= \frac{1}{d}(VWL)v$$

where L denotes the matrix $[L_{f_1}^{(b)}, \ldots, L_{f_d}^{(b)}]$ and v denotes the vector $[v_1, \ldots, v_d]$. Hence, in this case, the model corresponds to $$g(X)=Mv \text{ where } M \in \mathbb{R}^{k \times d} \text{ s.t. } \text{rank}(M)=\min\{k,l,m,d\}$$

In the non-linear case, the component-wise max can be employed. This strategy can model more complex decision functions. In this case, selecting m>k, l is meaningful. Intuitively, each dimension in the embedding space provides a meta-feature describing each (feature, value) pair and the max operator then outputs the best meta-feature match over the set of (feature, value) pairs, performing a kind of soft-OR, i.e. checking whether there is at least one pair for which the meta-feature is high. The max function performs an OR-type function on vectors with real values In this example, a real valued vector and the MAX is taken over all values; thus, if one or more elements are 'high' then the output is high, and if of the elements are 'low' then the output is low. The final classification decision is then taken as a linear combination of the MAX operation. The use of the MAX operator is similar to its common use in fixed set mapping for computer vision.

As indicated above, l and m are hyper-parameters that determine the dimensions of L, W and V. The training described below learns the parameters of L, W and V, for example, for fixed l and m. For example, in the case of $L_{f,v}$, L is a matrix containing all $L_{f,v}$ vectors, where these vectors are parameters which are also learned in training by gradient, as described in more detail herein below. The optimal l and m are found by cross-validation on the training set.

Referring again to training block 101 of the embodiment 100, the model learning that can be applied here aims to maximize the (log) posterior probability of the correct class over the training set $D_{train}=\{(X_i,y_i)\}_{i=1}^n$, i.e.

$$C = \sum_{i=1}^{n} \log P(y_i \mid X_i)$$

where model outputs are mapped to probabilities through a softmax function, i.e.

$$P(y \mid X) = \frac{\exp(g(X)_y)}{\sum_{y'=1}^{k} \exp(g(X)_{y'})}$$

Capacity control is achieved by selecting the hyperparameters l and m. For linear models, the criterion C is referred to as the multiclass logistic regression objective and has studied the relation between C and margin maximization. In the binary case (k=2), the criterion C is often referred to as the cross entropy objective.

The maximization of C can be conducted through stochastic gradient ascent, as this algorithm permits the use of large training sets and has good properties for non-convex problems, which is of interest for the non-linear model and for the linear model when rank regularization is used. The max function, which can be applied in the non-linear model, is not differentiable everywhere. However, it can be shown that gradient ascent can also be applied to generalized differentiable functions, which is the case of the loss function here.

Figure 2:
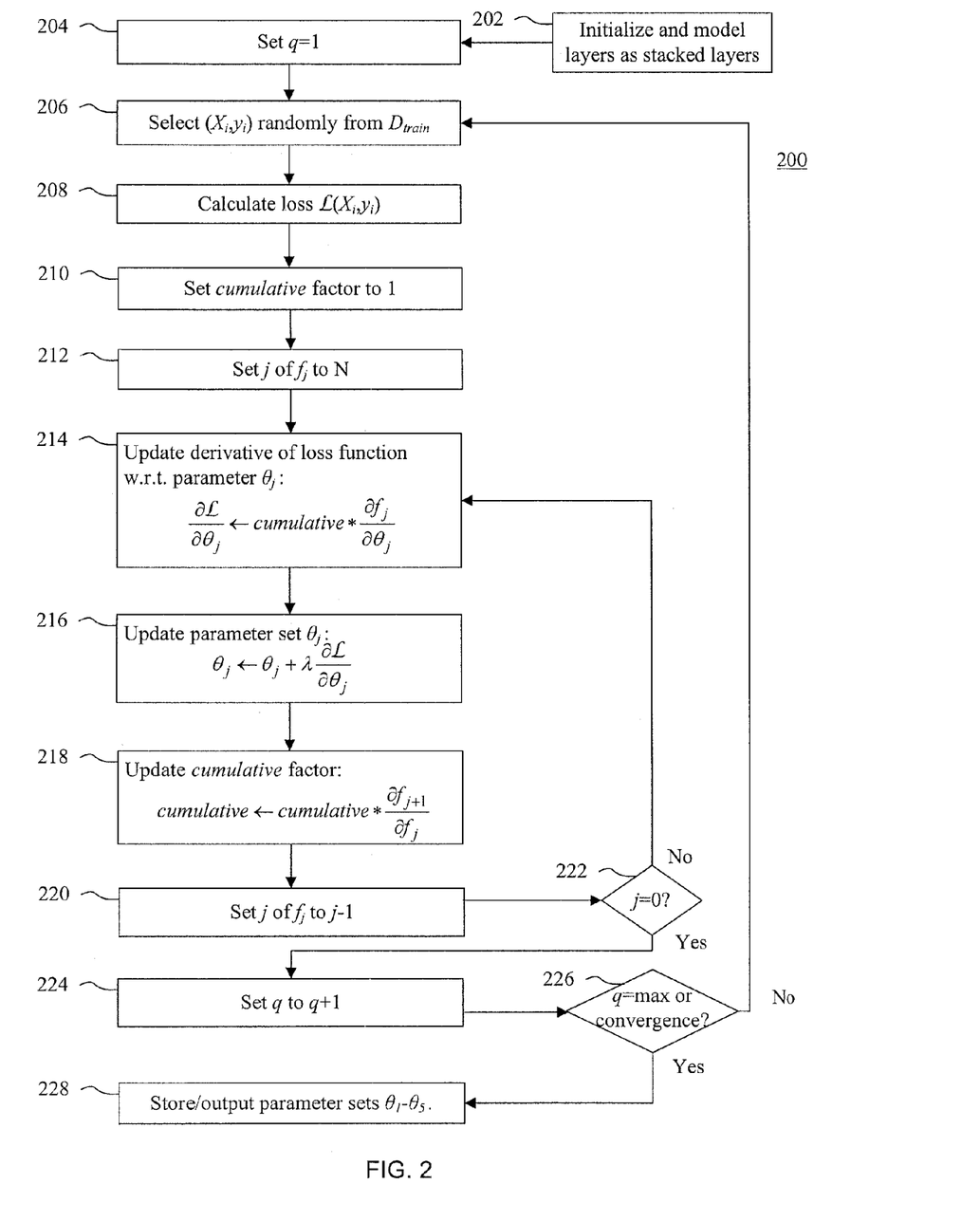
FIG. 2 is a high-level block/flow diagram of an embodiment of a method for training a system to classify incomplete data.

With reference now to FIG. 2, with continuing reference to FIG. 1, a training method 200 that optimizes the criterion C in accordance with an exemplary embodiment is illustrated. Prior to describing the method 200 in detail, some aspects of the models employed should be discussed. The system described above with respect to FIG. 1 can be represented as a 5-layer neural network architecture as follows:

1) Lookup tables, including features and values, which can correspond to block 102.

2) An embedding linear transformation, which can correspond to block 132.

3) A combining function, for example a mean or a max function, which can correspond to block 110.

4) A prediction linear transformation function, which can correspond to block 138.

5) A probability output, such as a log of a soft max.

Here, the function p is represented by layers 1 and 2, the function h is represented by layers 3 and 4, and the summation elements of criterion C are represented by layer 5.

The network can be trained using standard back propagation. The stacked layers in a neural network can be written in a form of embedded functions as follows: $s=f_N(f_{N-1}(\ldots(f_1(X,y))))$. In this example, $s=\log P(y|X)$, where $P(y|X)$ is the softmax function of layer 5 that is dependent on the function g, as described above, where g can be represented as the other four levels in accordance with the architecture described above, with $g=h \circ p$. Here, with N=5, the functions $f_N, \ldots, f_1$ represent the five layers of the architecture, respectively. As also indicated above, the function g can be defined, for example, in terms of the parameters for L, W and V for fixed l and m. Each set of parameters can be denoted by $\theta_j$, where j corresponds to the function $f_j$. Thus, the set of parameters $\theta_2$ can represent the parameters of WL and $\theta_4$ can represent the parameters of V.

For a layer $f_j$, $j \in [1, N]$ the derivative for updating its parameter set $\theta_j$ is:

$$\frac{\partial s}{\partial \theta_j} = \frac{\partial f_N}{\partial f_j} \frac{\partial f_j}{\partial \theta_j}.$$

The first factor on the right can be recursively calculated as follows:

$$\frac{\partial f_N}{\partial f_j} = \frac{\partial f_N}{\partial f_{j+1}} \frac{\partial f_{j+1}}{\partial f_j}.$$

As indicated above, the stochastic gradient ascent (SGA) method can be employed to accelerate training. For a set of training samples, instead of calculating the true gradient of the objective on all training samples, SGA calculates the gradient and the updates accordingly on each training sample. One exemplary training algorithm is defined below in table 1. Algorithm 1 of Table one provides one implementation of the method 200. In accordance with the stochastic aspect of the method, the parameters of g can be determined by maximizing each element, $\log P(y_i|X_i)$, of the sum in the criterion $$C = \sum_{i=1}^{n} \log P(y_i \mid X_i),$$

Thus, s is defined as $\log P(y|X)$.

TABLE 1

Algorithm 1: Exemplary End-to-End Training Procedure

```
for q = 1 to MaxIter do
    X_i, y_i ← random sampled data point and label
    calculate loss L(X_i, y_i)
    cumulative ← 1
    for j = 5 to 1 do
```

$$\frac{\partial \mathcal{L}}{\partial \theta_j} \leftarrow \text{cumulative} * \frac{\partial f_j}{\partial \theta_j}$$

$$\theta_j \leftarrow \theta_j + \lambda \frac{\partial \mathcal{L}}{\partial \theta_j}$$

$$\text{cumulative} \leftarrow \text{cumulative} * \frac{\partial f_{j+1}}{\partial f_j}$$

```
    end for
end for
```

Referring again to FIG. 2 and the method 200 in detail, the method 200 can begin at step 202, in which the training block 101 can initialize the method 200. For example, the training block 101 can model each of the five layers as stacked layers: $s = f_N(f_{N-1}(\ldots(f_1(x,y))))$, where the functions $f_N, \ldots, f_1$ respectively represent the five layers of the architecture with N=5. Here, the function s is referred to as the loss function $\mathcal{L}(X,y)$.

At step 204, the training block can set a counter q to 1. The counter q is employed to determine whether a maximum number of iterations, for example, MaxIter of Algorithm 1 of Table 1, of the method has been reached.

At step 206, the training block 101 randomly selects a set of feature-value pairs with its corresponding class $(X_i, y_i)$ from the training data set $D_{train}$.

At set 208, the training block 101 calculates the loss $\mathcal{L}(X_i, y_i)$ based on the randomly selected set $(X_i, y_i)$. Here, the loss function can be defined, as described above, in terms of the criterion C and the functions p and h. The initial values of the parameter sets $\theta_1$-$\theta_5$ for the functions $f_1$-$f_5$, respectively, in the first iteration of the method 200 can be set to zero.

At step 210, the training block 101 can set the cumulative factor to 1. The cumulative factor can be employed to recursively determine the first factor in the derivative of the loss function with respect to $$\theta_j : \frac{\partial s}{\partial \theta_j} = \frac{\partial f_N}{\partial f_j} \frac{\partial f_j}{\partial \theta_j},$$

as indicated above. In addition, the cumulative variable is utilized here to determine the functions via back propagation, as stated above. Thus, the function $f_5$ corresponding to the log of a softmax, log $P(y_i|X_i)$, is initially examined.

As such, at step 212, the training block can set a counter j of $f_j$ to N. As noted above, in this example, N=5.

At step 214, the training block can update the derivative of the loss function with respect to the set of parameters $$\theta_j, \frac{\partial \mathcal{L}}{\partial \theta_j},$$

by setting $$\frac{\partial f_j}{\partial \theta_j}$$

in $$\frac{\partial \mathcal{L}}{\partial \theta_j}$$

as cumulative *

$$\frac{\partial f_j}{\partial \theta_j}.$$

As indicated above, the first iteration of the method 200 updates $$\frac{\partial \mathcal{L}}{\partial \theta_5},$$

by setting $$\frac{\partial f_5}{\partial \theta_5}$$

in $$\frac{\partial \mathcal{L}}{\partial \theta_5}$$

as cumulative *

$$\frac{\partial f_5}{\partial \theta_5}$$

At step 216, the training block 101 can update the parameter set $\theta_j$ by setting the parameter set $$\theta_j \text{ to } \theta_j + \lambda \frac{\partial \mathcal{L}}{\partial \theta_j}.$$

$\lambda$ is the learning rate and can be set based on design choice. For example, $\lambda$ can be set to 0.1 or 1. Alternatively or additionally, it can be decreased gradually as the method 200 iterates over q.

At step 218, the training block 101 can update the cumulative factor. For example, the training block 101 can set cumulative to cumulative *

$$\frac{\partial f_{j+1}}{\partial f_j}.$$

At step 220, the training block 101 can set the counter j of $f_j$ to j−1 to examine the set of parameters $\theta_{j-1}$ for the next function $f_{j-1}$ in the stack for the set of feature-value pairs with its corresponding class $(X_i,y_i)$ randomly selected at step 206.

The method can then proceed to step 222, at which the training block 101 can determine whether the counter j is zero. If j is zero, then all of the parameter sets for each of the functions or layers of the architecture have been evaluated for $(X_i,y_i)$ randomly selected at step 206 and the method can proceed to step 224. If j is not zero, then the method can proceed to step 214 and can be repeated for the next function and corresponding set of parameters in the stack for $(X_i,y_i)$ randomly selected at step 206.

At step 224, the training block 101 can set the counter q to q+1.

At step 226, the training block 101 can determine whether the functions $f(X_i,y_i)$ for each of the sets of feature-value pairs with corresponding classes in the training data set $D_{train}$ have converged to their maximum values. If not, then the method can proceed to step 206, another set of feature-value pairs with its corresponding class $(X_i,y_i)$ in the training data set $D_{train}$ can be selected, and the method can be repeated for the newly selected $(X_i,y_i)$. If the functions $f(X_i,y_i)$ for each of the sets of feature-value pairs with corresponding classes in the training data set $D_{train}$ have converged to their maximum values, then the method can proceed to step 228, at which the training block 101 can output and/or store the deter lined parameter sets $\theta_1$-$\theta_5$ for use in the system/method 100 for classifying incomplete data. It should also be noted that, at step 226, the training block 101 can also determine whether the counter q has reached its maximum value. If not, then the method can proceed to step 206, as stated above, and can be repeated. If the counter q has reached its maximum value, then method can proceed to step 228, at which the training block 101 can store/output the determined parameter sets $\theta_1$-$\theta_5$, as stated above.

It should be noted that the method 200 is performed for a particular selection of the hyperparameters l, m. The hyperparameters l, m and the number of training iterations (i.e., the maximum value of the counter q) can be validated by first training the model on ⅘ of the training data and assessing the model on the remainder of the training data. In other words, the training block 101 can select a given value for l and a given value for m. Further, the training block 101 can use ⅘ of the training data set $D_{train}$ to determine p and h, as described above with respect to method 200. In addition, the training block can apply p and h to the remaining ⅕ of the training data set to determine whether the resulting confidence values accurately reflect the valid classes of the remaining ⅕ of the training data set. The training block 101 can be configured to adjust the values of the hyperparameters l, m and repeat the method 200 to determine p and h based on the ⅘ of the training data set $D_{train}$ and on the adjusted hyperparameters. Here, the training block 101 can iterate the process until the resulting confidence values accurately reflect the valid classes of the remaining ⅕ of the training data set or until the resulting confidence values are within an error threshold that can be set by a user.

With regard to validation of the hyperparameters in the non-linear case, in accordance with one exemplary aspect, the main control on the model capacity is the embedding size m. Its selection is simple, as varying this parameter consistently yields convex validation curves. The rank regularizer l does not need much tuning, yielding a stable validation performance for a wide range of values.

Exemplary embodiments of feature set embedding methods, systems, apparatuses and devices for the problem of classification with missing features have been described. The approaches described herein above deviate from the standard classification paradigm: instead of considering examples as feature vectors, examples are considered as sets of (feature, value) pairs, which handles the missing feature problem more naturally. Further, in order to classify sets, embodiments can apply a new strategy relying on two levels of modeling. At the first level, each (feature, value) is mapped onto an embedding space. At the second level, the set of embedded vectors is compressed onto a single embedded vector over which classification (e.g., a linear classification) is applied. Further, the training can utilize stochastic gradient ascent to jointly learn the embedding space and the final linear decision function.

The strategy has several advantages compared to prior work. For example, sets are conceptually better suited than vectors for dealing with missing values. In addition, embedding (feature, value) pairs offers a flexible framework which easily enables encoding prior knowledge about the features.

From a broader perspective, the flexible feature embedding framework can be applied in a variety of applications in addition to the missing feature application. In particular, the flexible feature embedding framework enables the use of meta-features (attributes describing a feature). For example, the embedding vector of the temperature features in a weather prediction system could be computed from the locations of their sensors. It also enables designing a system in which new sensors are added without requiring full model re-training: in this case, the model could be quickly adapted by only updating embedding vectors corresponding to the new sensors.

Having described preferred embodiments of feature set embedding methods and systems (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for classifying incomplete data comprising:
generating pairs of features and values based upon feature measurements on the incomplete data;
applying a transformation function on the pairs of features and values to generate a set of vectors by mapping each of the pairs to a corresponding vector in an embedding space;
applying, by a hardware processor, a prediction function to the set of vectors to generate at least one confidence assessment for at least one class that indicates whether the incomplete data is of the at least one class; and
outputting the at least one confidence assessment;
wherein the transformation function includes a parameter matrix, wherein the prediction function includes a prediction matrix and wherein the maximizing comprises jointly determining the parameter and prediction matrices.

2. The method of claim 1, wherein the method further comprises jointly determining the transformation function and the prediction function by
receiving a training data set including a plurality of sets of training feature-value pairs and including a mapping of each of the sets of training feature-value pairs to a corresponding valid class; and
maximizing a probability that the prediction function provides a highest assessment to each of the valid classes for each corresponding set of training feature-value pairs if the corresponding set of training feature-value pairs are the pairs of features and values from which the set of vectors is generated.

3. The method of claim 1, wherein the transformation function is of the form $p(f,v)=WL_{f,v}$, where $p(f,v)$ is the transformation function, f is a given feature, v is a given value for the given feature, W is the parameter matrix and $L_{f,v}$ is a parameter vector that is associated with the given feature and with the given value, and wherein the prediction function is of the form $h(P)=V\Phi(P)$, where $h(P)$ is the prediction function, V is the prediction matrix, $\Phi(P)$ is a generalized differentiable function and P is a particular set of pairs of features and values.

4. The method of claim 3, wherein the parameter vector is an element of an !-dimensional space of real numbers, the generalized differentiable function outputs a resulting vector that is an element of an m-dimensional space of real numbers, the parameter matrix is an element of an m×l-dimensional space of real numbers, and wherein the method further comprises selecting particular values of m and l and validating the selected values by applying the transformation function and the prediction function on a different set of training feature-value pairs.

5. The method of claim 3, wherein the parameter vector is configured such that at least one specific value is sharable between specific features in given pairs of features and values or at least one particular feature is sharable between particular values in the given pairs of features.

6. The method of claim 2, wherein the maximizing further comprises applying a stochastic gradient ascent method.

7. The method of claim 1, wherein the feature measurements include confidence values indicating reliabilities of the feature measurements.

8. A system for classifying incomplete data comprising:
a code generator configured to generate pairs of features and values based upon feature measurements on the incomplete data;
a transformation module configured to apply a transformation function on the pairs of features and values to generate a set of vectors by mapping each of the pairs to a corresponding vector in an embedding space for inclusion of the corresponding vector in the set of vectors; and
a prediction module implemented by a hardware processor and configured to apply a prediction function to the set of vectors to generate a confidence assessment for a class that indicates whether the incomplete data is of the class, wherein the prediction module is fhrther configured to output the confidence assessment.

9. The system of claim 8, wherein the system further comprises:
a training module configured to jointly determine the transformation function and the prediction function by receiving a training data set including a plurality of sets of training feature-value pairs and including a mapping of each of the sets of training feature-value pairs to a corresponding valid class, and by maximizing a probability that the prediction function provides a highest assessment to each of the valid classes for each corresponding set of training feature-value pairs if the corresponding set of training feature-value pairs are the pairs of features and values from which the set of vectors is generated.

10. The system of claim 9, wherein the transformation function includes a parameter matrix, wherein the prediction function includes a prediction matrix and wherein the maximizing comprises jointly determining the parameter and prediction matrices.

11. The system of claim 10, wherein the transformation function is of the form $p(f,v)=WL_{f,v}$, where $p(f,v)$ is the transformation function, f is a given feature, v is a given value for the given feature, W is the parameter matrix and $L_{f,v}$ is a parameter vector that is associated with the given feature and with the given value, and wherein the prediction function is of the form $h(P)=V\Phi(P)$, where $h(P)$ is the prediction function, V is the prediction matrix, $\Phi(P)$ is a generalized differentiable function and P is a particular set of pairs of features and values.

12. The system of claim 11, wherein the parameter vector is an element of an !-dimensional space of real numbers, the generalized differentiable function outputs a resulting vector that is an element of an m-dimensional space of real numbers, the parameter matrix is an element of an m×l-dimensional space of real numbers, and wherein the method further comprises selecting particular values of m and l and validating the selected values by applying the transformation function and the prediction function on a different set of training feature-value pairs.

13. The system of claim 11, wherein the parameter vector is configured such that at least one specific value is sharable between specific features in given pairs of features and values or at least one particular feature is sharable between particular values in the given pairs of features.

14. The system of claim 9, wherein the maximizing further comprises applying a stochastic gradient ascent method.

15. The system of claim 8, wherein the feature measurements include confidence values indicating reliabilities of the feature measurements.

16. A method for training a system to classify incomplete data comprising:
receiving a training data set including a plurality of sets of training feature-value pairs and including a mapping of each of the sets of training feature-value pairs to a corresponding valid class;
modeling layers of the system as stacked layers, wherein the layers of the system include an embedding transformation layer configured to generate a set of vectors by mapping each feature-value pair of at least one of the sets of training feature-value pairs to a corresponding vector in an embedding space,
a prediction transformation layer configured to generate, based on the set of vectors, at least one confidence assessment for at least one particular class that indicates whether the at least one of the sets of training feature-value pairs is of the at least one particular class, and
a probability function layer that assesses a probability that the transformation functions result in a given valid class for a corresponding given set of training feature-value pairs; and
determining, by a hardware processor, parameter sets for each of the layers by iteratively incrementing values of the parameter sets for each of the layers until the probability function layer indicates that the probabilities that the transformation layers result in each of the valid classes for the corresponding sets of training feature-value pairs are maximized or until a maximum number of iterations is reached.

17. The method of claim 16, wherein the system includes a lookup table layer configured to include reference pairs of features and values.

18. The method of claim 17, wherein the system includes a combining function layer configured to combine the set of vectors into a resulting vector and wherein the prediction transformation layer is configured to generate the at least one confidence assessment based on the resulting vector.

19. The method of claim 18, wherein the method further comprises selecting particular values of hyper parameters directed to an embedding size and to a rank regularizer and validating the selected values by applying the transformation layers and the prediction function layer on a different set of training feature-value pairs.

\* \* \* \* \*